United States Patent
Kehimkar et al.

(10) Patent No.: US 9,925,844 B2
(45) Date of Patent: Mar. 27, 2018

(54) TWO DOOR STRUCTURE FOR PARTIAL RECIRCULATION IN AN AIR CONDITIONING SYSTEM

(71) Applicant: Denso International America, Inc., Southfield, MI (US)

(72) Inventors: Simon Kehimkar, Detroit, MI (US); Gregory Thompson, Ortonville, MI (US)

(73) Assignee: DENSO International America, Inc., Southfield, MI (US)

( * ) Notice: Subject to any disclaimer, the term of this patent is extended or adjusted under 35 U.S.C. 154(b) by 734 days.

(21) Appl. No.: 13/962,030

(22) Filed: Aug. 8, 2013

(65) Prior Publication Data

US 2015/0044958 A1    Feb. 12, 2015

(51) Int. Cl.
*B60H 1/00* (2006.01)

(52) U.S. Cl.
CPC ..... *B60H 1/00028* (2013.01); *B60H 1/00021* (2013.01); *B60H 1/00849* (2013.01); *B60H 2001/00085* (2013.01); *B60H 2001/00185* (2013.01)

(58) Field of Classification Search
CPC ........ B60H 1/26; B60H 1/00857; B60H 1/30; B60H 1/00378; B60H 1/00564; B60H 1/00021; B60H 1/00028; B60H 1/00849; B60H 1/24; B60H 201/00185; B60H 2001/00085
USPC ................ 454/143, 139, 155, 141, 145, 265
See application file for complete search history.

(56) References Cited

U.S. PATENT DOCUMENTS

| | | | |
|---|---|---|---|
| 6,213,198 B1 * | 4/2001 | Shikata | B60H 1/00478 165/202 |
| 7,357,176 B2 | 4/2008 | Yelles | |
| 2006/0086495 A1 | 4/2006 | Yelles | |
| 2007/0218824 A1 * | 9/2007 | Bailey | B60H 1/00564 454/139 |

FOREIGN PATENT DOCUMENTS

| | | | | |
|---|---|---|---|---|
| EP | 0558397 A1 | 9/1993 | | |
| EP | 0 558 397 | 11/1996 | | |
| FR | 2801843 | * 6/2001 | ......... | B60H 1/00028 |
| JP | 05-069729 A | * 3/1993 | ............ | B60H 1/00 |
| JP | 10-138737 | 5/1998 | | |

OTHER PUBLICATIONS

Office Action dated Sep. 10, 2015 in corresponding DE Application No. 10 2014 109 873.0 with English translation.

(Continued)

*Primary Examiner* — Gregory Huson
*Assistant Examiner* — Dana Tighe
(74) *Attorney, Agent, or Firm* — Harness, Dickey & Pierce, P.L.C.

(57) ABSTRACT

A heating, ventilation and air conditioning system includes a blower unit that has an interior air intake and an exterior air intake. Two doors are moved between open and closed positions to define a recirculation mode, a fresh mode and a partial recirculation mode. As the doors move between their open and closed positions, a variable partial mode and a variable fresh mode are defined.

16 Claims, 8 Drawing Sheets

(56) References Cited

OTHER PUBLICATIONS

Office Action dated Sep. 2, 2014 in corresponding JP Application No. 2014-013630 with English translation.
Office Action dated Feb. 22, 2016 issued in the corresponding CN application No. 2014 1038 6306.5 in Chinese with English translation.
Office Action dated Feb. 24, 2015 in corresponding JP Application No. 2014-013630 (with English translation).

* cited by examiner

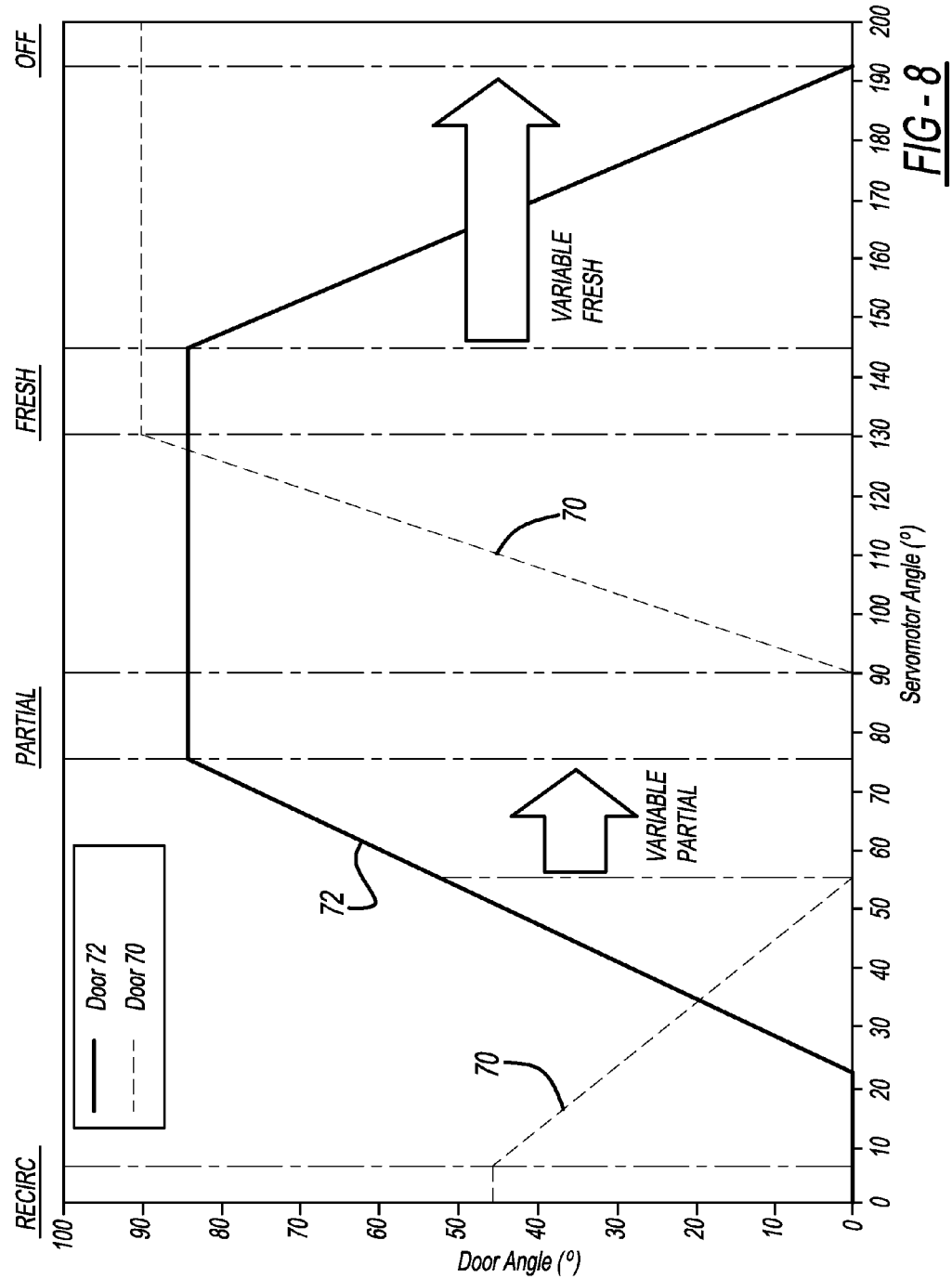

TWO DOOR STRUCTURE FOR PARTIAL RECIRCULATION IN AN AIR CONDITIONING SYSTEM

FIELD

The present disclosure relates to a vehicle Heating, Ventilation and Air Conditioning (HVAC) system. More particularly, the present disclosure relates to a two door structure for partial recirculation in the HVAC system.

BACKGROUND

This section provides background information related to the present disclosure which is not necessarily prior art.

Vehicles are known to incorporate HVAC systems to improve the comfort of the people within the passenger compartment of the vehicle. The HVAC systems heat and cool air blown through the HVAC system using a heating heat exchanger and/or a cooling heat exchanger. The heating heat exchanger typically utilizes the engine coolant as a source of heat for heating the air. The cooling heat exchanger is typically an evaporator which is part of an air conditioning system in the vehicle powered by the engine of the vehicle. The air blown through the HVAC system comes from air outside the vehicle, air inside the passenger compartment of the vehicle or a combination of the air outside the vehicle and the air inside the passenger compartment of the vehicle. The air being blown through the HVAC system is conditioned (heated/cooled) and is then directed into the passenger compartment of the vehicle through one or more outlet vents.

Although these vehicle HVAC systems have worked for their intended purposes, some disadvantages remain. For instance, these HVAC systems typically include an exterior air intake vent through which air from outside the vehicle enters the HVAC system (fresh mode). These HVAC systems also typically include an interior air intake vent through which air from inside the vehicle enters the HVAC system (recirculation mode). In a mixture configuration where air from the exterior air intake vent and air from the interior air intake vent are mixed (partial recirculation mode), both the exterior air intake vent and the interior air intake vent are open.

One disadvantage of the typical air intake systems of the present day is the packaging size required for the dual intake system for air from outside the vehicle and air from inside the vehicle. In addition, these present day systems only allow for three specific control or intake modes. These three modes are a fresh mode where only air from outside the vehicle is used, a partial recirculation mode where both air from outside the vehicle and air from inside the vehicle is used and a recirculation mode where only air from inside the vehicle is used. Another disadvantage to a system that only includes the three modes listed above is a loss of potential performance during vehicle warm up because you must pull all airflow from the fresh mode during the vehicle warm up to avoid window fogging or risk an air leak from outside the vehicle (fresh mode) directly to the inside of the vehicle because of no partial door seal. If a dedicated partial mode is provided, you can use a combination of both the recirculation mode and the fresh mode which is more efficient because the inside air is already warmer than the outside air.

SUMMARY

This section provides a general summary of the disclosure, and is not a comprehensive disclosure of its full scope or all of its features.

The present disclosure provides a solution to both of the disadvantages described above. The present disclosure utilizes two "butterfly" doors to counter these disadvantages. The two "butterfly" doors allow for the partial recirculation mode function in a smaller packaging footprint. In addition, the two "butterfly" doors provide not only the fresh mode, the partial recirculation mode and the recirculation mode, the two "butterfly" door concept also provides a RAM air control which is a variable partial and a variable fresh concept.

In utilizing the two "butterfly" doors, along with the associated linkage design, the disclosure can allow the use of multiple modes including the fresh mode, the partial recirculation mode, the recirculation mode with the added function of RAM air control. RAM air control allows an increased user operation range while the doors move from the fresh mode to an off position. The two "butterfly" door system allows the user to control the fresh and recirculation amount while preventing fresh air from bypassing the blower.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a graph showing the movement of the door of the HVAC system in relation to one another.

DETAILED DESCRIPTION

Figure 1:
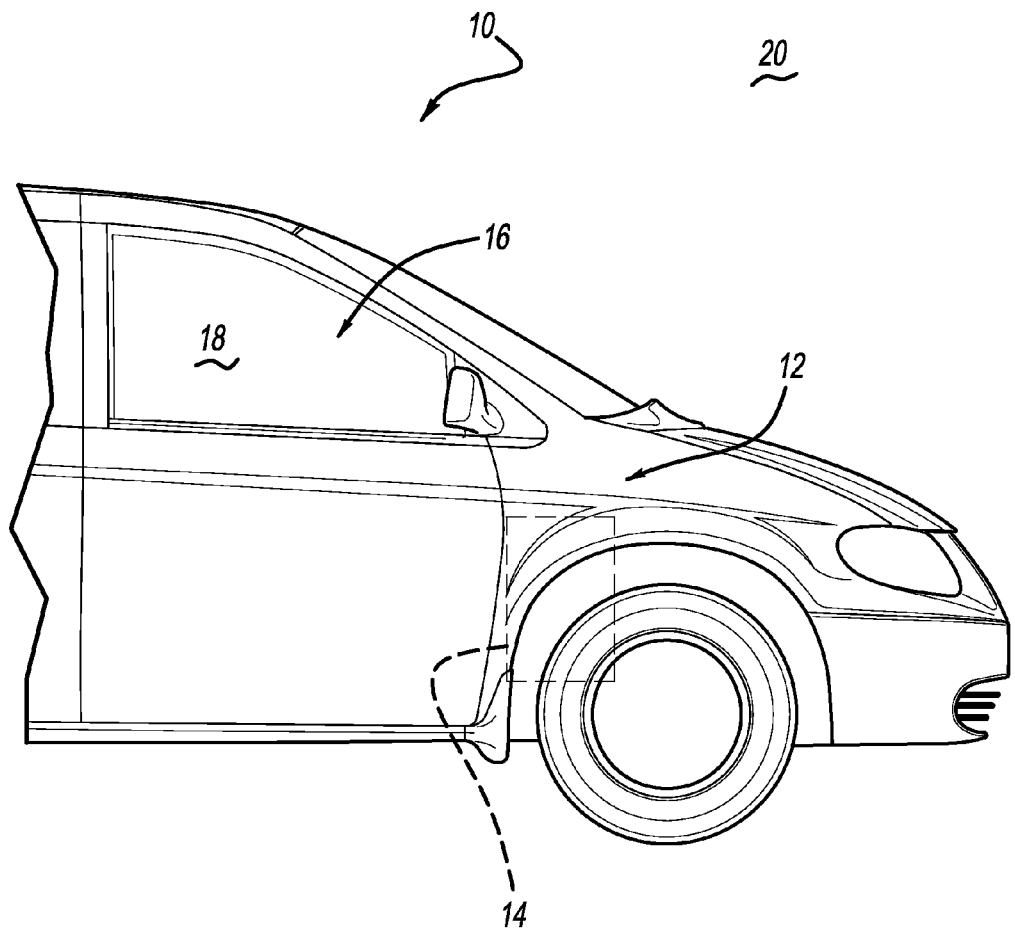
FIG. 1 is a side view of a vehicle with an HVAC system schematically illustrated therein.

The following description is merely exemplary in nature and is not intended to limit the present disclosure, application, or uses. It should be understood that throughout the drawings, corresponding reference numerals indicate like or corresponding parts and features.

Referring initially to FIG. 1, a vehicle 10 is illustrated. The vehicle 10 includes an engine compartment generally indicated at 12. A heating, venting, and air conditioning (HVAC) unit 14 is included within the engine compartment 12 as schematically illustrated in FIG. 1. The vehicle 10 also includes a passenger compartment 16. The passenger compartment 16 defines an interior space 18 within the passenger compartment 16 and an exterior space 20 outside the passenger compartment 16. The HVAC unit 14 heats and/or cools air within the interior space 18 of the passenger compartment 16 in a known manner.

Figure 2:
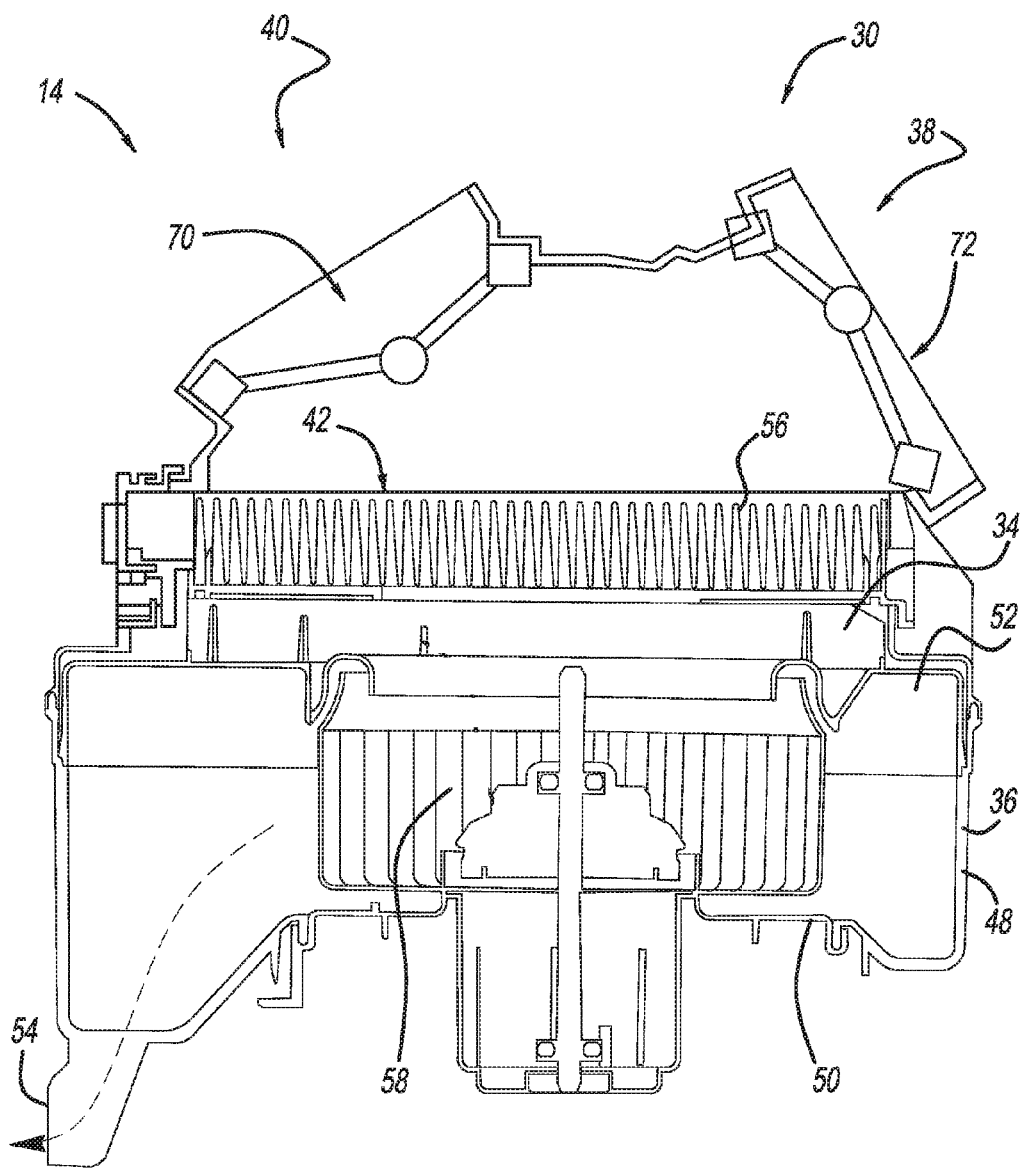
FIG. 2 is a sectional view of a blower unit of the HVAC system of FIG. 1.
Figure 3:
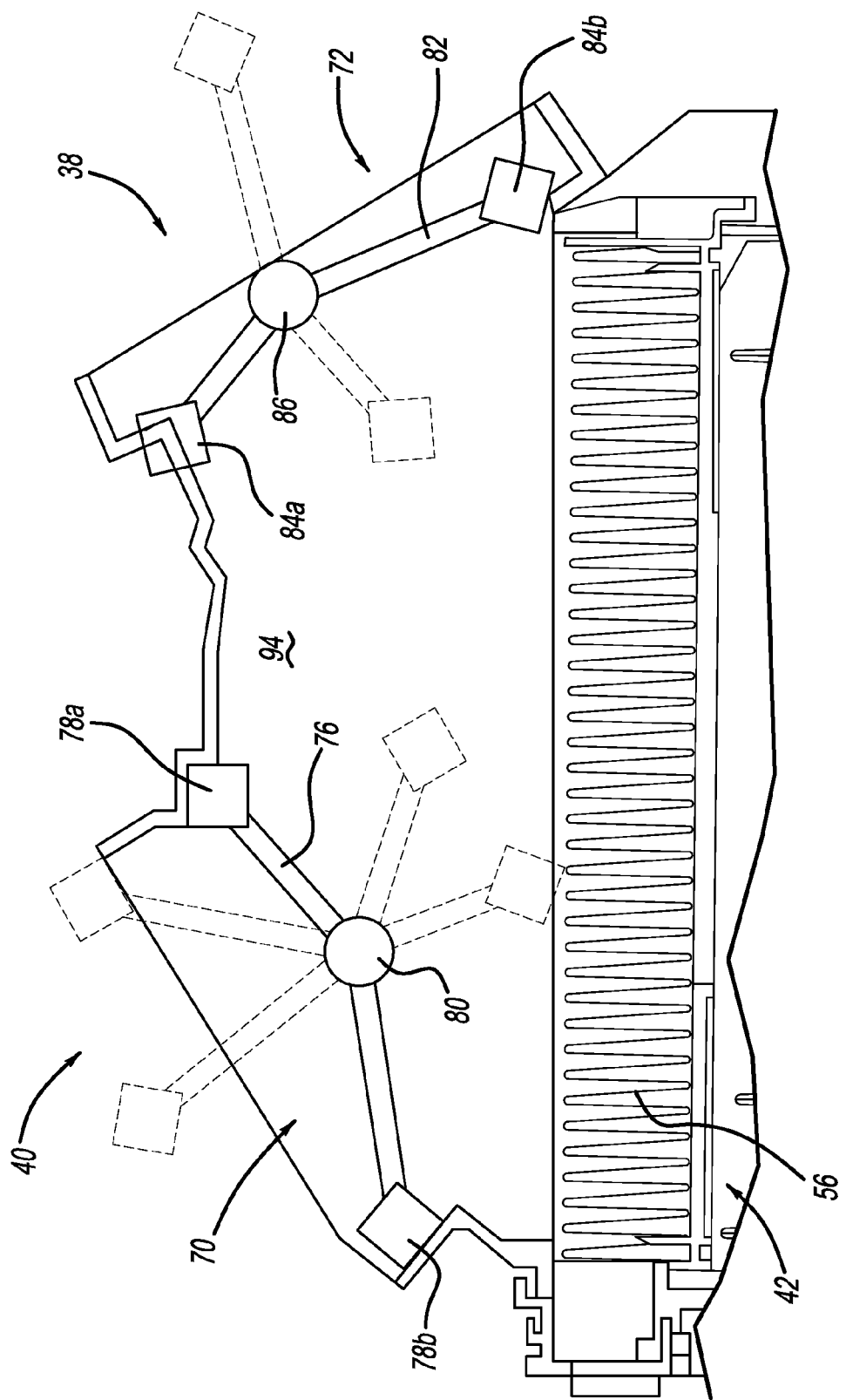
FIG. 3 is a sectional view of the blower unit of the HVAC system of FIG. 2.
Figure 4:
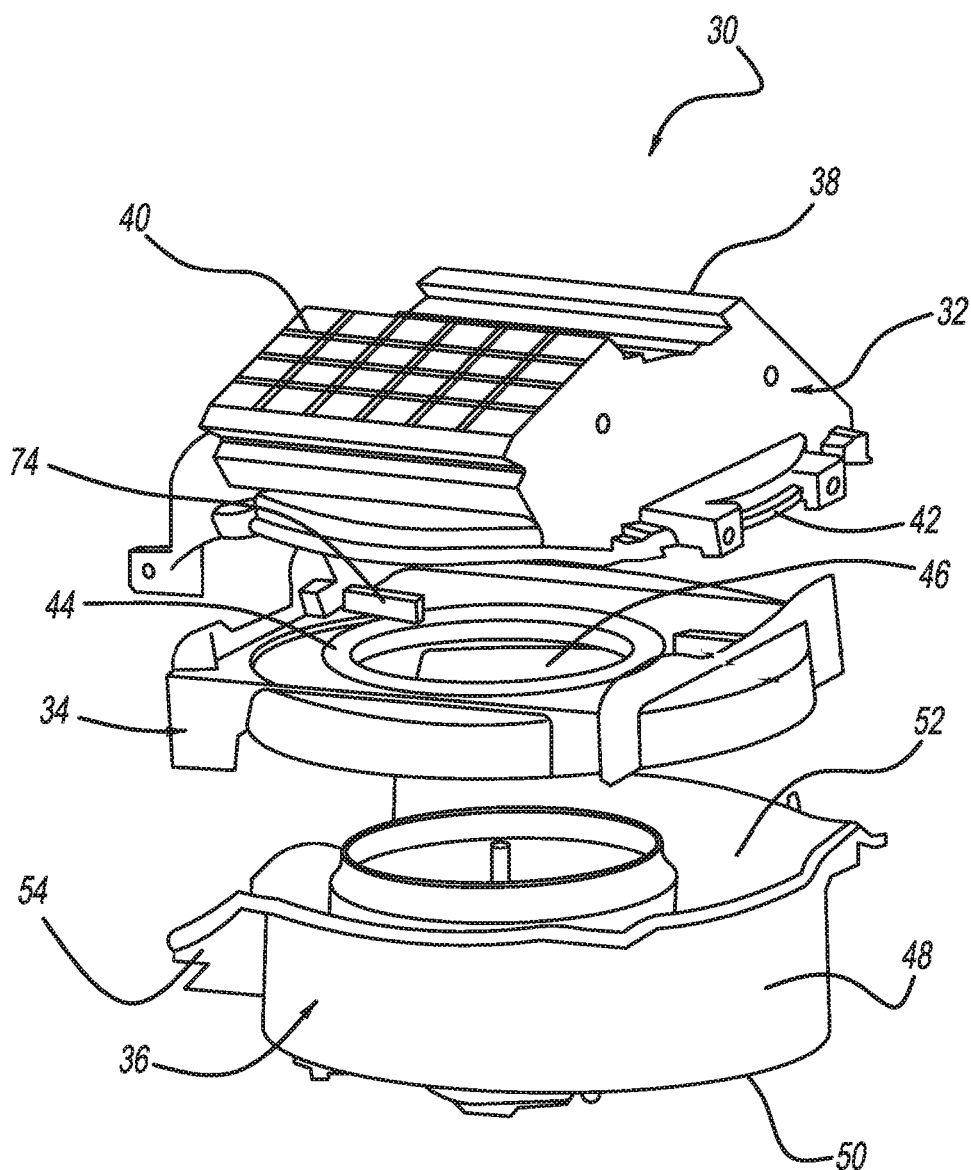
FIG. 4 is an exploded view of the blower unit of the HVAC system of FIG. 2.

Referring now to FIGS. 2, 3 and 4, a blower unit 30 of the HVAC unit 14 is illustrated. In general, the blower unit 30 draws in air from the interior space 18 and/or the exterior space 20, and the blower unit 30 moves the air through a heating heat exchanger (not shown) and/or a cooling heat exchanger (not shown) such that the air can be heated and/or cooled as is well known in the art. Once the air is heated/cooled, the air moves into the interior space 18 for the comfort of the passengers. FIG. 2 illustrates the blower unit 30 in an off mode.

As shown in FIGS. 2 and 4, the blower unit 30 generally includes an upper case member 32, a bellmouth member 34, and a lower case member 36. The bellmouth member 34 is disposed between and coupled to the upper case member 32 and the lower case member 36. The upper case member 32, bellmouth member 34, and lower case member 36 can be coupled in any suitable manner. In one embodiment, the upper case member 32, the bellmouth member 34, and the lower case member 36 are each made out of a rigid plastic material. Also, in one embodiment, the upper case member 32, the bellmouth member 34, and the lower case member 36 are manufactured individually by molding processes.

The upper case member 32 is generally hollow and defines an exterior air intake aperture 38 as shown in FIGS. 2 and 4. The exterior air intake aperture 38 is in fluid communication with the exterior space 20 outside the vehicle 10. As such, air from the exterior space 20 is able to enter the blower unit 30 through the exterior air intake aperture 38. The upper case member 32 also defines an interior air intake aperture 40. The interior air intake aperture 40 is in fluid communication with the interior space 18 of the passenger compartment 16 of the vehicle 10. As such, air within the interior space 18 is able to enter the blower unit 30 through the interior air intake aperture 40. The upper case member 32 further includes a lower opening 42. The lower opening 42 is in fluid communication with the bellmouth member 34.

The bellmouth member 34 is generally flat and ring-shaped as shown in FIG. 4. The bellmouth member 34 includes an upper surface 44, and the bellmouth member 34 also defines a central aperture 46.

The lower case member 36 generally includes an outer wall 48 and a lower wall 50. The outer wall 48 defines an open top end 52, and the bellmouth member 34 substantially covers the top end 52 of the lower case member 36. The lower case member 36 also includes an exhaust port 54. The exhaust port 54 is in fluid communication with a heating heat exchanger (not shown) and/or a cooling heat exchanger (not shown). As such, air through the blower unit 30 can exit the blower unit 30 through the exhaust port 54 to be heated and/or cooled.

As shown in FIGS. 2 and 3, the blower unit 30 also includes a filter 56. The filter 56 is supported by the upper case member 32 adjacent the lower opening 42 and substantially covers the lower opening 42. As such, dust and any other particulate matter is filtered out of the air as it passes from the upper case member 32 to the bellmouth member 34.

The blower unit 30 further includes a fan 58. The fan 58 can be of any suitable type. In the embodiment shown in FIGS. 2 and 4, the fan 58 is disposed within the lower case member 36. The fan 58 is operable to draw air into the blower unit 30 through the exterior air intake aperture 38 and/or the interior air intake aperture 40.

More specifically, operation of the fan 58 can cause air to enter the blower unit 30 through the exterior air intake aperture 38 and/or the interior air intake aperture 40. That air then moves through the filter 56, and any particulate matter is filtered out. Next, the air moves through the lower opening 42 of the upper case member 32 and then through the central aperture 46 of the bellmouth member 34. The fan 58 then sucks the air into the lower case member 36, and then the fan 58 pushes the air out the exhaust port 54 toward the heating heat exchanger or the cooling heat exchanger (not shown).

As shown in FIG. 2, the blower unit 30 includes a first door 70 and a second door 72. In the embodiment shown, the first door 70 and the second door 72 are each rotatable around a central region of the door. These types of doors are referred to as "butterfly" doors. Each of the first door 70 and the second door 72 have a pair of generally flat and axially straight portions that extend from the point of rotation of the door to form an obtuse angle with respect to the door. This obtuse angle is chosen to guide the air flow during the various modes of the HVAC system as illustrated in the figures. The first door 70 includes a core member 76 and compressible members 78a, 78b coupled on opposite sides of the core member 76. The core member 76 forms the pair of generally flat and axially straight portions that extend from the point of rotation of the first door 70 to form the obtuse angle. In one embodiment, the core member 76 is made of a hard plastic and the compressible members 78a, 78b are made out of foam. The first door 70 is movably coupled to the upper case member 32. In the embodiment shown, for instance, the first door 70 is pivotally coupled to the upper case member 32 by at least one pin 80 disposed at the central region of the first door 70 to form the point of rotation of the first door 70. Thus, as shown in FIG. 2, the first door 70 is able to pivot about the pin 80 to open and close the interior air intake aperture 40.

The second door 72 is similar to the first door 70. More specifically, the second door 72 includes a core member 82 and a compressible member 84a, 84b coupled on opposite sides of the core member 82. The core member 82 forms the pair of generally flat and axially straight portions that extend from the point of rotation of the second door 72 to form the obtuse angle. In one embodiment, the core member 82 is made of a hard plastic and the compressible members 84a, 84b are made out of foam. The second door 72 is movably coupled to the upper case member 32. In the embodiment shown, for instance, the second door 72 is pivotally coupled to the upper case member 32 by at least one pin 86 disposed at the central region of the second door 72 to form the point of rotation of the second door 72. Thus, as shown in FIG. 2, the second door 72 is able to pivot about the pin 86 to open and close the exterior air intake aperture 38.

The first and second door 70, 72 can move independent of each other. The first and second door 70, 72 can be actuated about the respective pins 80, 86 in any suitable manner, such as by using one or more motors. A linkage system may be incorporated to pivot one or both of the first and second doors 70, 72.

Figure 5:
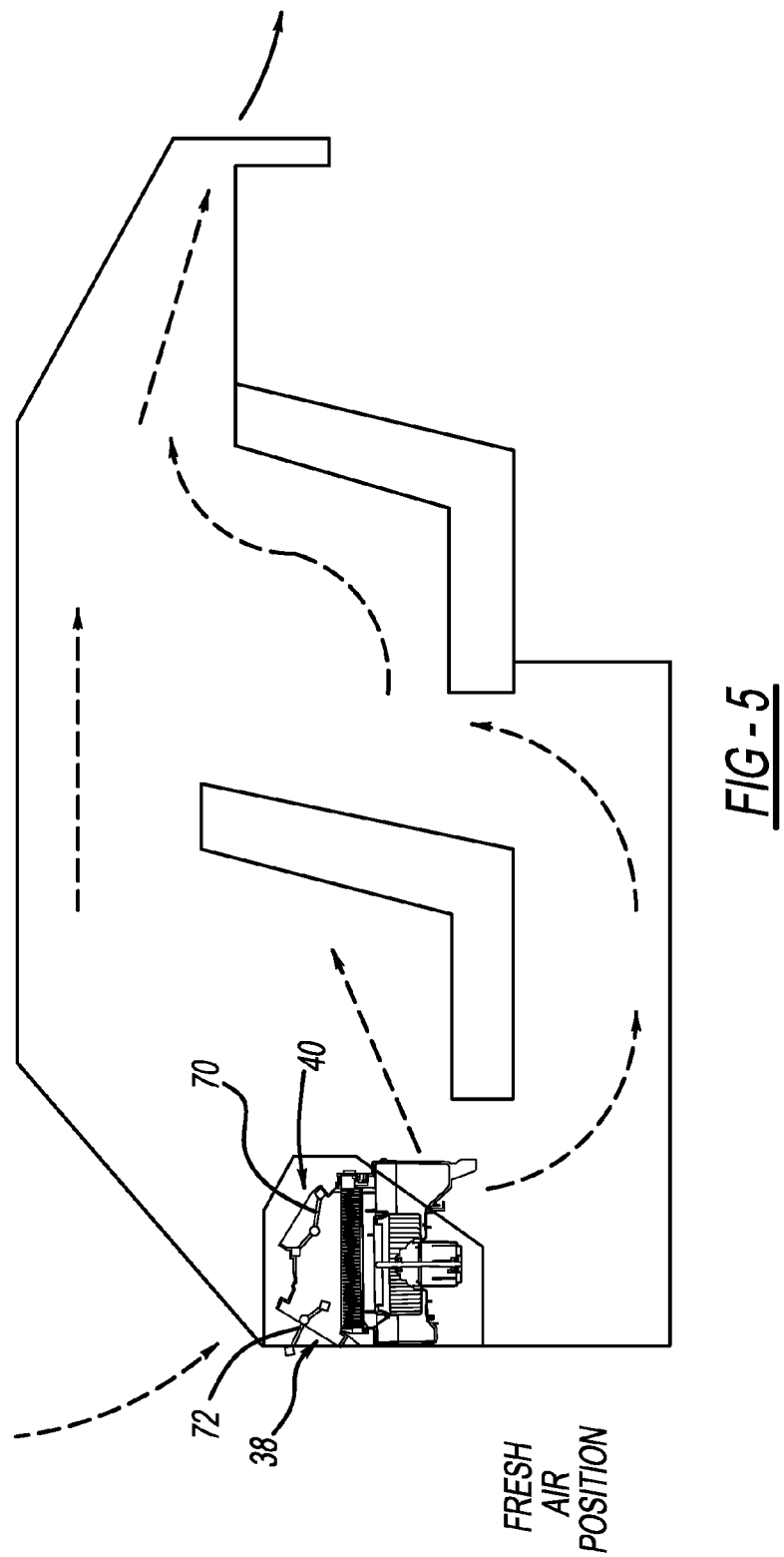
FIG. 5 is a schematic view of a passenger compartment of a vehicle and the blower unit of the HVAC system of FIG. 2 shown in a "FRESH AIR" position.
Figure 6:
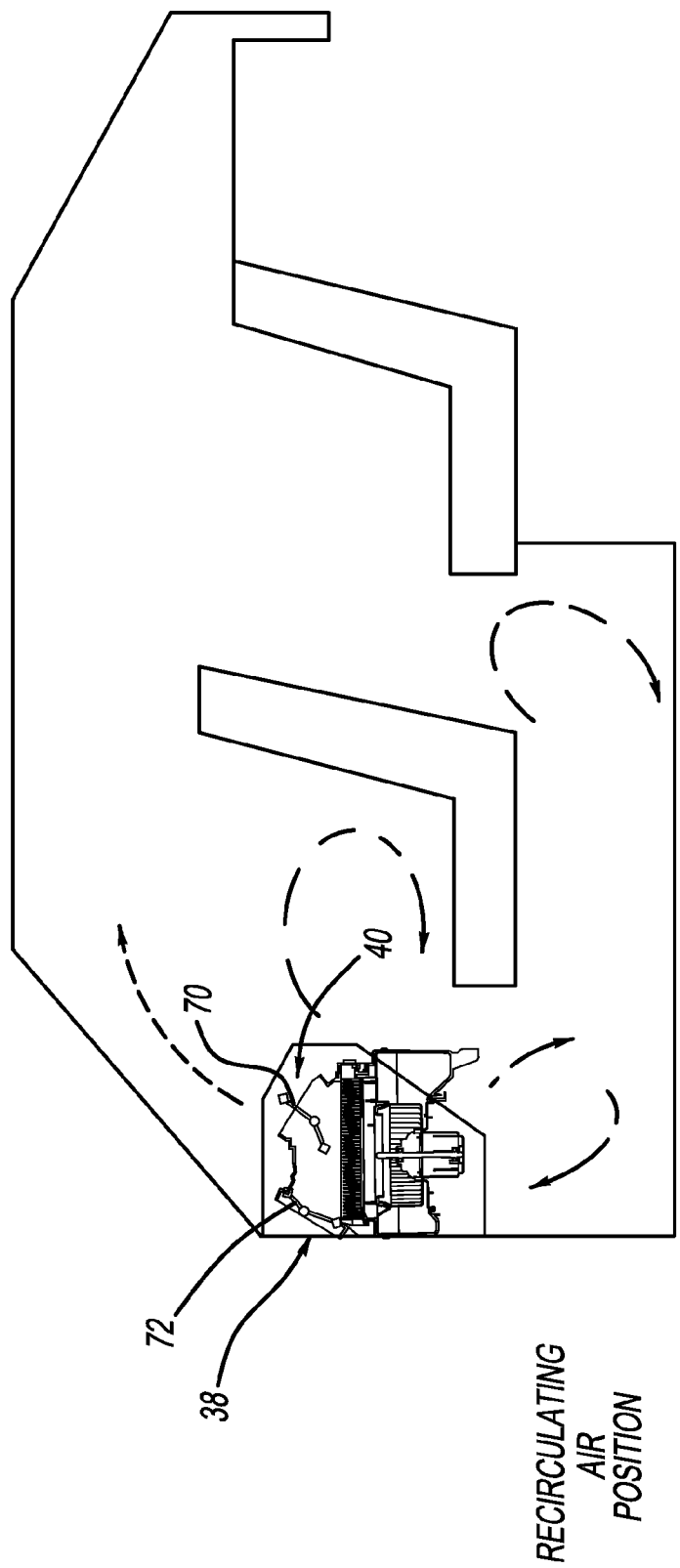
FIG. 6 is a schematic view of a passenger compartment of a vehicle and the blower unit of the HVAC system of FIG. 2 shown in a "RECIRCULATING AIR" position.
Figure 7:
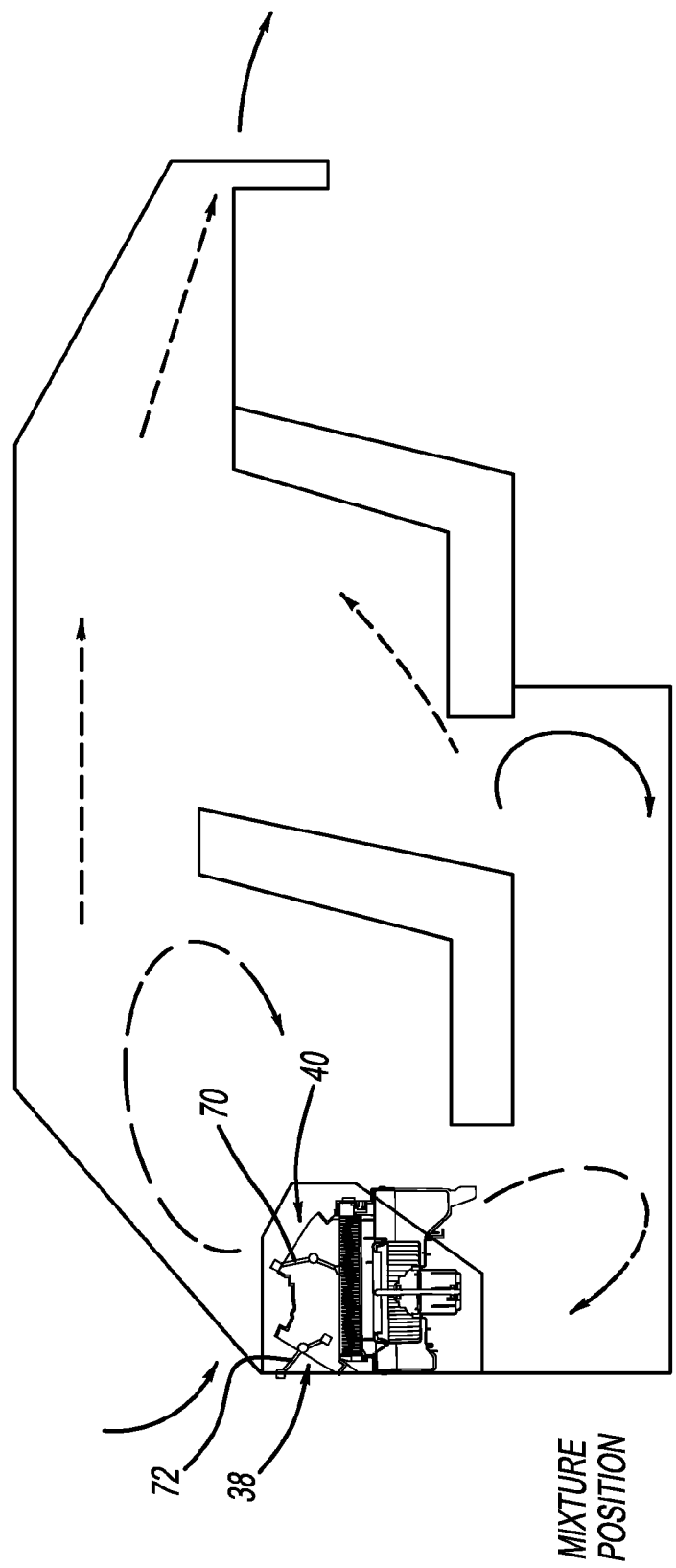
FIG. 7 is a schematic view of a passenger compartment of a vehicle and the blower unit of the HVAC system of FIG. 2 shown in a "MIXTURE" position.

The first and second doors 70, 72 can be moved between a fresh air mode (FIG. 5), a recirculating air mode (FIG. 6) and a mixture mode (FIG. 7). In the fresh air mode, the first door 70 obstructs the interior air intake aperture 40 and the second door 72 fully opens the exterior air intake aperture 38. More specifically, the first door 70 is disposed against the upper case member 32 such that the compressible members 78a, 78b deform to create seals at the periphery of the interior air intake aperture 40. In addition, the second door 72 is disposed in a central region of exterior air intake aperture 38 to fully open the exterior air intake aperture 38. The pair of generally flat and axially straight portions of the second door 72 guide the air flowing through the exterior air intake aperture 38 such that the air has full access to the lower opening 42 of the upper case member 32. As such, air is able to enter the blower unit 30 through the exterior air intake aperture 38 and air is unlikely to enter the blower unit 30 through the interior air intake aperture 40. More specifically, air is able to enter the blower unit 30 through the exterior air intake aperture 38 and flow on both sides of the second door 72, through the filter 56, through the bellmouth member 34, through the lower case member 36 and out of the blower unit 30 through the exhaust port 54. In this manner, the exterior air introduced into the interior of vehicle 10 will be fresh and thus enjoyable for passenger breathing comfort.

In the recirculating air mode, FIG. 6, the second door 72 obstructs the exterior air intake aperture 38 and the first door 70 fully opens the interior air intake aperture 40. More specifically, the second door 72 is disposed against the upper case member 32 such that the compressible members 84a, 84b deform to create seals at the periphery of the exterior air intake aperture 38. In addition, the first door 70 is disposed in a central region of interior air intake aperture 40 to fully open the interior air intake aperture 40. The pair of generally flat and axially straight portions of the first door 70 guide the air flowing through the interior air intake aperture 40 such that the air has full access to the lower opening 42 of the upper case member 32. As such, air is able to enter the blower unit 30 through the interior air intake aperture 40 and air is unlikely to enter the blower unit 30 through the exterior air intake aperture 38. More specifically, air is able to enter the blower unit 30 through the interior air intake aperture 40 and flow on both sides of the first door 70, through the filter 56, through the bellmouth member 34, through the lower case member 36 and out of the blower unit 30 through the exhaust port 54. In this manner, the interior air introduced into the interior of vehicle 10 will be recirculated from the interior of the vehicle which allows the HVAC unit 14 to operate more efficiently to thereby conserve fuel.

When the first and second doors 70, 72 are in the mixture mode, FIG. 7, the first door 70 fully obstructs an air passage 94 which extends between the exterior air intake aperture 38 and the interior air intake aperture 40 by sealing against the upper case member 32 and against the filter 56. More specifically, the first door 70 abuts against the filter 56 and the upper case member 32 which deforms the compressible members 78a, 78b to thereby create a seal. This position fully opens interior air intake aperture 40 to allow air flow on only one side of the first door 70. The second door 72 is disposed in a central region of the exterior air intake aperture 38 to fully open the exterior air intake aperture 38 to fully open the exterior air intake aperture 38 to allow air flow on both sides of the second door 72. As such, air is able to enter the blower unit 30 through both the exterior air intake aperture 38 and the interior air intake aperture 40. Then the air flows through the filter 56, through the bellmouth member 34, through the lower case member 36 and out of the blower unit 30 through the exhaust port 54.

It will be appreciated that the first door 70 prohibits air flow through the air passage 94 because the first door 70 is sealed against the upper case member 32 and the filter 56. In one embodiment, the first door 70 and the compressible members 78a, 78b prevent substantially all air flow through the air passage 94. As such, air is unlikely to leak into the passenger compartment 16 from the exterior space 20 of the vehicle 10 without first being heated or cooled by the HVAC unit 14. This, in turn, causes the HVAC unit to work more efficiently and conserve fuel for the vehicle 10.

Referring now to FIG. 8, the relationship between the two doors 70, 72 is illustrated. The relationship between the position of the two doors 70, 72 is illustrated in relation to the rotational angle of a servomotor (not shown). It is to be understood that the servomotor operates a linkage assembly (not shown) that controls the rotation of the two doors 70, 72. In FIG. 8, the door angle for the first door 70 of forty-five degrees (recirculation mode) is when the first door 70 fully opens the interior air intake aperture 40, an angle of zero degrees is when the first door 70 fully closes the air passage 94 and an angle of ninety degrees is when the first door 70 fully closes interior air intake aperture 40. The door angle for the second door 72 is zero degrees when the exterior air intake aperture 38 is fully closed and is eight degrees when the exterior air intake aperture 38 is fully closed.

A variable partial mode is defined between the recirculation mode and the partial recirculation mode when the first door 70 moves to its closed position and the second door 72 moves between the closed position and the open position. A variable fresh mode is defined between the fresh mode and an off mode when first door 70 is in the closed position and second door 72 moves between the open position and the closed position.

The advantages of having the partial recirculation mode, the variable fresh mode and the variable partial mode is quicker vehicle warm up without fogging of the windows and the anti-bypass system which stops air from traveling directly from the exterior air intake aperture 38 into the vehicle without first going through the air conditioning (HVAC) unit 14. The advantage of having a two door system rather than a three door system includes less packaging space due to less linkage and less cost to perform the same function.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation and air conditioning system comprising:
   an upper case defining an exterior air intake aperture and an interior air intake aperture;
   a first door rotatably attached to the upper case, the first door movable between an open position where the interior air intake aperture is open, a first closed position where the interior air intake aperture is completely closed by the first door and a second closed position where an air passage between the exterior air intake passage and the interior air intake passage is closed;
   a second door rotatably attached to the upper case, the second door movable between an open position where the exterior air intake aperture is open and a closed position where the exterior air intake aperture is completely closed by the second door;
   a bellmouth member in fluid communication with the upper case;

a lower case defining an exhaust port, the bellmouth member arranged between the lower case and the upper case; and a single fan seated within the lower case, the single fan sucks air in through both the exterior air intake aperture and the interior air intake aperture, and blows the air sucked in through the exterior air intake aperture and the interior air intake aperture out through the exhaust port;

wherein the first door and the second door are arranged such that when the first door is in the second closed position and the second door is in the open position airflow entering the upper case through the exterior air intake aperture and the interior air intake aperture is permitted to flow from the upper case to the lower case through the bellmouth member.

2. The heating, ventilation and air conditioning system according to claim 1, wherein the air passage is open when the first door is in the open position.

3. The heating, ventilation and air conditioning system according to claim 2, wherein the air passage is open when the first door is in the first closed position.

4. The heating, ventilation and air conditioning system according to claim 1, wherein the interior air intake aperture is open when the first door is in the second closed position.

5. The heating, ventilation and air conditioning system according to claim 1, wherein the air passage is open when the first door is in the first closed position.

6. The heating, ventilation and air conditioning system according to claim 5, wherein the interior air intake aperture is open when the first door is in the second closed position.

7. The heating, ventilation and air conditioning system according to claim 1, wherein the interior air intake aperture is open when the first door is in the second closed position.

8. The heating, ventilation and air conditioning system according to claim 1, wherein the heating, ventilation and air conditioning system defines a recirculation mode when the first door is in the open position and the second door is in the closed position.

9. The heating, ventilation and air conditioning system according to claim 8, wherein the heating, ventilation and air conditioning system defines a fresh mode when the first door is in the first closed position and the second door is in the open position.

10. The heating, ventilation and air conditioning system according to claim 9, wherein the heating, ventilation and air conditioning system defines a partial recirculation mode when the first door is in the second closed position and the second door is in the open position.

11. The heating, ventilation and air conditioning system according to claim 10, wherein the heating, ventilation and air conditioning system defines a variable partial mode between the recirculation mode and the partial recirculation mode.

12. The heating, ventilation and air conditioning system according to claim 10, wherein the heating, ventilation and air conditioning system defines variable fresh mode between the fresh mode and an off mode.

13. The heating, ventilation and air conditioning system according to claim 9, wherein the heating, ventilation and air conditioning system defines variable fresh mode between the fresh mode and an off mode.

14. The heating, ventilation and air conditioning system according to claim 1, wherein the heating, ventilation and air conditioning system defines a fresh mode when the first door is in the first closed position and the second door is in the open position.

15. The heating, ventilation and air conditioning system according to claim 14, wherein the heating, ventilation and air conditioning system defines a partial recirculation mode when the first door is in the second closed position and the second door is in the open position.

16. The heating, ventilation and air conditioning system according to claim 1, wherein the heating, ventilation and air conditioning system defines a partial recirculation mode when the first door is in the second closed position and the second door is in the open position.

* * * * *